United States Patent
Pacheco et al.

(10) Patent No.: US 7,840,938 B1
(45) Date of Patent: Nov. 23, 2010

(54) SYSTEMS FOR RETAINING STATE INFORMATION IN A DYNAMICALLY TYPED TEXT-BASED ENVIRONMENT

(75) Inventors: Paulo Pacheco, Westport, MA (US); Ricardo Losada, Framingham, MA (US); Donald Paul Orofinio, II, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 906 days.

(21) Appl. No.: 10/634,304

(22) Filed: Aug. 4, 2003

(51) Int. Cl.
*G06F 9/44* (2006.01)
(52) U.S. Cl. .................................... 717/108
(58) Field of Classification Search ................ 717/108
See application file for complete search history.

(56) References Cited

U.S. PATENT DOCUMENTS

| | | | | |
|---|---|---|---|---|
| 5,677,951 | A * | 10/1997 | Gay | 379/406.08 |
| 6,606,588 | B1 * | 8/2003 | Schaumont et al. | 703/15 |
| 6,633,894 | B1 * | 10/2003 | Cole | 708/300 |
| 2001/0025292 | A1 * | 9/2001 | Denk et al. | 708/550 |
| 2002/0121993 | A1 * | 9/2002 | Velazquez | 341/118 |
| 2002/0147554 | A1 * | 10/2002 | Pickerd | 702/66 |
| 2004/0010527 | A1 * | 1/2004 | Lee | 708/322 |

OTHER PUBLICATIONS

"Digital Filter Solutions", http://web.archive.org/web/20021120051701/http://www.filter-solutions.com/, retrieved on Dec. 19, 2006.*
"AutoCode Solutions", http://web.archive.org/web/20021120051701/http://www.filter-solutions.com/, retrieved on Dec. 19, 2006.*

* cited by examiner

*Primary Examiner*—Philip Wang
(74) *Attorney, Agent, or Firm*—Lahive & Cockfield, LLP; Kevin J. Canning; Neslihan I. Doran

(57) ABSTRACT

A method for retaining state information of a digital filter object in a dynamically typed text-based programming environment is disclosed. The digital filter object retains state information which includes the minimal amount of information that is necessary to determine the output of the digital filter object. The digital filter object generates the output of the object in response to the input of the object depending on the state information of the object. The state of the filter is stored in a memory and provided to the object as an initial value of the state of the object.

40 Claims, 8 Drawing Sheets

MATLAB

510 — >> [b,a]=butter(12,.25);
520 — >> Hd = dfilt.df2(b,a)

Hd =

530 {
    FilterStructure:  'Direct form II' — 540
    States:  [12x1 double] — 550
    ResetStates:  'on' — 560
    Numerator:  [1x13 double] — 570
    Denominator:  [1x13 double] — 580

*Fig. 5*

MATLAB

610 → >> x=sin(2*pi*.05*[0:15-1])';
620 → >> y=filter(Hd,x);

MATLAB

710 — >> Hd.ResetStates = 'off';
720 — >> for k=0:5:length(x)-5;
730 — >> y = filter(Hd,x(k+1:k+5))
>> end 740
```
y =
1    0
2    0.3090
3    0.5878
4    0.8090
5    0.9511
```

SYSTEMS FOR RETAINING STATE INFORMATION IN A DYNAMICALLY TYPED TEXT-BASED ENVIRONMENT

FIELD OF THE INVENTION

The present invention relates generally to state information retaining systems and more particularly to methods and systems for retaining state information in a dynamically typed text-based programming environment.

BACKGROUND OF THE INVENTION

A system may be viewed as a combination and interconnection of several components to generate an output in response to an input applied to the system. The output of the system depends upon the input of the system. In some systems, the output also depends on the state of the system. In a linear, time-invariant electric circuit, for example, capacitor voltages and inductor currents uniquely specify the circuit condition at any particular time. Thus, the values of the capacitor voltages and inductor currents constitute the state of the circuit.

In a computer, systems may be implemented, simulated or modeled in various programming environments. The programming environments enable computer users to create a computer program for implementing, simulating or modeling the systems, which is written in a set of syntax and semantic rules for expressing instructions to a computer. MATLAB, from The MathWorks, Inc. of Natick, Massachusetts, provides a well-known dynamically typed text-based programming environment. MATLAB integrates mathematical computing, visualization, and a powerful language to provide a flexible environment for technical computing.

Generally, a sequence of input data is applied to a system to produce the output of the system. In the case of a long sequence of input data, it is necessary to input to the system divided portions of the sequence of input data by remembering the state of the system between subsequent runs. This is commonly referred to as streaming data processing or filtering in a loop when the system is a filter. The conventional systems or filters provided in a dynamically typed text-based programming environment did not retain state information of the systems or filters, and therefore were less appropriate in the context of streaming data processing or filtering in a loop. Therefore, the conventional systems including filters provided in a dynamically typed text-based programming environment did not efficiently process a long sequence of input data.

SUMMARY OF THE INVENTION

The present invention provides methods and systems for retaining state information of the system in a dynamically typed text-based programming environment. The present invention retains state information which includes the minimal amount of information that is necessary to determine an output of the system in a dynamically typed text-based programming environment. The present invention generates the output in response to an input of the system depending on the state information. The state information obtained in the process of the input data is stored in a memory and used as an initial value of the state in processing the next input data.

In an illustrative embodiment of the present invention, a method is provided for implementing and using a filter object which generates an output in response to an input. The output of the filter object depends on the input and the state of the filter object which includes a minimum amount of information necessary to determine the output of the filter object. The method provides equations performed by the filter object. The equations include the state of the filter object. The state of the filter object is retained in a dynamically typed text-based programming environment.

In another illustrative embodiment of the present invention, a method is provided for generating the output of a system in response to the input of the system in a dynamically typed text-based programming environment. The state of the system is specified to include a minimum amount of information that is necessary to determine the output of the system. The state of the system is retained in a memory and provided to the system to determine the output of the system.

In still another illustrative embodiment of the present invention, a medium is provided for holding computer-executable instructions for a method in a computer that provides a dynamically typed text-based programming environment. The computer generates the output of an object in response to the input of the object. There is provided in the computer a class from which the object is instantiated. The state of the object is retained in the class as a property of the object. The output of the object is determined depending on the input and the state of the object.

By retaining the state information, the system of the present invention can perform streaming data processing or filtering in a loop in a dynamically typed text-based programming environment. As a result, the present invention efficiently processes a long sequence of data by performing streaming data processing in a dynamically typed text-based programming environment.

BRIEF DESCRIPTION OF THE DRAWINGS

FIG. 5 is an exemplary display in a computer suitable for practicing the illustrative embodiment of the present invention, which displays the MATLAB command sequences to implement a filter object in the illustrative embodiment of the present invention;

FIG. 6 is an exemplary display in a computer suitable for practicing the illustrative embodiment of the present invention, which displays the MATLAB command sequences for using the filter object implemented in FIG. 5; and FIG. 7 is an exemplary display of a computer suitable for practicing the illustrative embodiment of the present invention, which displays the MATLAB command sequences for performing streaming data processing by using the filter object implemented in FIG. 5.

DETAILED DESCRIPTION

Figure 1:
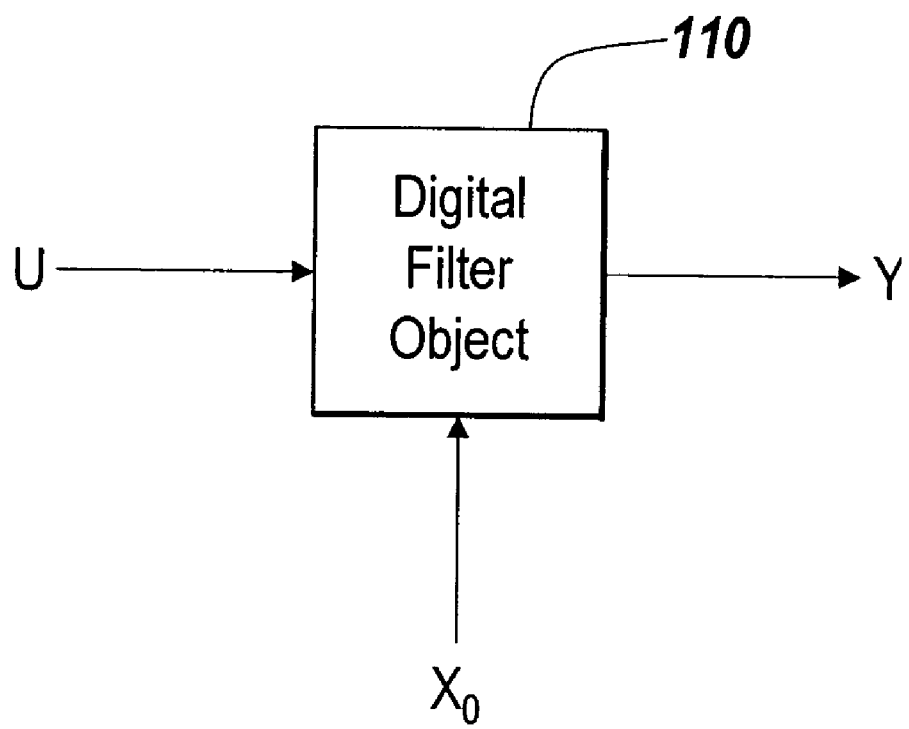
FIG. 1 is a block diagram representation of a digital filter object that is an illustrative embodiment of a system in the present invention in which an output Y is generated in response to an input data U and initial state information ($X_0$)

The illustrative embodiment of the present invention concerns a system implemented in a dynamically typed text-based programming environment. The system retains state information which includes the minimal amount of information that is necessary to determine the output of the system. The state information is used to generate the output of the system in response to the input applied to the system. In one embodiment, a filter object retains filter state information.

The system of the illustrative embodiment of the present invention performs streaming data processing in a dynamically typed text-based programming environment. In processing multiple sequences of input data, the state information obtained in processing a sequence of input data is stored and used as an initial value of the state of the system in processing the following sequence of input data. As a result, the illustrative embodiment of the present invention can efficiently process a long sequence of data by dividing the long sequence of input data into multiple sequences and processing each sequence of input data separately. Hence, for example, a filter may retain filter state and be easily used to process a long sequence of data The system of the illustrative embodiment of the present invention is implemented in a dynamically typed text-based programming environment. MATLAB, from MathWorks, Inc. of Natick, Mass., provides an exemplary dynamically typed text-based programming environment, which integrates mathematical computing, visualization, and a powerful language to provide a flexible environment for technical computing. Another example of the dynamically typed text-based programming environment can be found in PYTHON created by Guido van Rossum. PYTHON is a portable and interpreted programming language.

In a dynamically typed programming environment, types are assigned to each data value in memory at runtime, rather than assigning a type to a static, syntactic-entity in the program source code. The dynamically typed programming environment catches errors related to the misuse of values at the time the erroneous statement or expression is executed. In contrast, types are assigned to sets of values based on the program's source code in a statically typed programming environment. Static type disciplines operate on program source code rather than on the program execution. Therefore, in the statically typed programming environment, certain kinds of errors are detected without executing the program. The statically typed programming environment is provided, for example, in JAVA, from Sun Microsystems, Inc. of Palo Alto, Calif.

A text based programming environment provides characters representing the words and symbols of human speech. Characters are one of the forms in which computers can store and transmit information, and usually coded according to ASCII standard, which assigns numeric values to numbers, letters, and certain symbols. In contrast, graphical programming environment provides graphical elements, such as block diagrams, to represent data flow visually in a program.

FIG. 1 is a block diagram of a system, such as a digital filter object 110, in the illustrative embodiment of the present invention. The digital filter object 110 is implemented as an object in a dynamically typed text-based programming environment, such as MATLAB and PYTHON. The digital filter object 110 receives input data U, which may include a single piece of sample data, a sequence of sample data or even multiple sequences of data. The filter object 110 generates an output Y in response to the input data U depending on the initial state information ($X_0$). The state information ($X_0$) of the filter object 110 at time $t_0$ includes the minimum information necessary to specify completely the condition of the filter object 110 at time $t_0$ and determine an output of the filter object 110 at time $t > t_0$ when input data U up to time t is specified. In a linear, time-invariant digital filter, for example, the output of a delay operator ($z^{-1}$) uniquely specifies the filter condition at any particular time. Thus, the values of the output of a delay ($z^{-1}$) constitute the state of the filter.

The digital filter object 110, of the illustrative embodiment of the present invention is available in the Signal Processing Toolbox and in the Filter Design Toolbox, software products produced by The MathWorks, Inc. of Natick, Mass.

The Signal Processing Toolbox is a collection of MATLAB functions that provides a customizable framework for analog and digital signal processing (DSP). Graphical user interfaces (GUIs) support interactive designs and analyses, while command-line functions support advanced algorithm development. The Signal Processing Toolbox provides functions for signal and linear system models; tools for analog filter design, finite impulse response (FIR) and infinite impulse response (IIR) digital filter design, scaling, analysis, and implementation; transforms, such as fast Fourier transform (FFT) and discrete cosine transform (DCT); methods for spectrum estimation, including Time-Frequency analysis, and statistical signal processing; functions for parametric time-series modeling; routines for waveform generation, including Gaussian pulse, periodic sinc, and pulse train generators; extensive list of data windowing algorithms; object-oriented digital filter and window objects; GUI for designing, analyzing, and visualizing signals, filters and windows. You can use the toolbox in speech and audio processing, communications, digital control, radar, geophysics, test instrumentation, real-time control, finance, medicine, and other applications.

The Filter Design Toolbox extends the capabilities of the Signal Processing Toolbox by adding a comprehensive set of filter architectures and design methods for complex real-time DSP applications, including adaptive and multirate filtering. The Filter Design Toolbox also provides functions that simplify the design of fixed-point filters and the analysis of quantization effects.

The filter design types and algorithms include advanced equiripple FIR design which automatically determine minimum filter order. It provides constrained ripple, minimum phase, extra ripple, and maximal ripple designs. The least P-th norm FIR design optimizes your filter for any norm from 2 to infinity. It allows you to adjust the trade-off between minimum stopband energy and minimum order equiripple characteristics. Allpass IIR filter design with arbitrary group delay enables the equalization of nonlinear group delays of other IIR filters to obtain an overall approximate linear phase passband response. Least P-th norm IIR design creates optimal IIR filters with arbitrary magnitude. It lets you specify the numerator and denominator orders independently and lets you optimize the design for any norm from 2 to infinity. Constrained least P-th norm IIR design constrains the maximum radius of the filter poles to improve the robustness of the quantization. The halfband FIR design can automatically determine minimum filter order with either the equiripple or window methods. Nyquist (L-th band) filter design lets you select linear and minimum phase designs with equiripple and window methods. Interpolated FIR (IFIR) design lets you choose between simple, intermediate, and advanced optimization. Adaptive filters, including Least Mean Squares, and Recursive Least Squares are self-learning filters that achieve a particular effect when no a priori signal information is available.

The Filter Design Toolbox supports designing, simulating, and analyzing fixed-point and custom floating-point filters for a wide range of precision. It also allows you to compute quantized fast Fourier transforms (FFTs) and inverse FFTs. These functions help you determine the effects of quantization on your real-world designs. The quantization tools allow you to precisely model the behavior of your fixed-point filter and FFT algorithms. The quantized algorithms in the toolbox will match the output of the algorithms on a fixed-point DSP, FPGA, or ASIC exactly because the simulation is bit-true. You can detect limit cycles or overflows, allowing you to iterate your design in the MATLAB environment before hardware implementation.

While processing the input data U, the digital filter object 110 retains state information of the filter object 110. The digital filter object 110 is an illustrative embodiment of the present invention and one of skill in the art will appreciate that the system of the present invention that retains the state information is not limited to the digital filter object 110 but rather includes any system that produces an output depending on the state of the system. One of skill in the art will also appreciate that the system of the present invention may include a dynamical system in which the current output of the system is determined depending on present and previous inputs. Since the dynamical system's output is the result of present and previous inputs, the state information contains information about the previous inputs.

Figure 2:
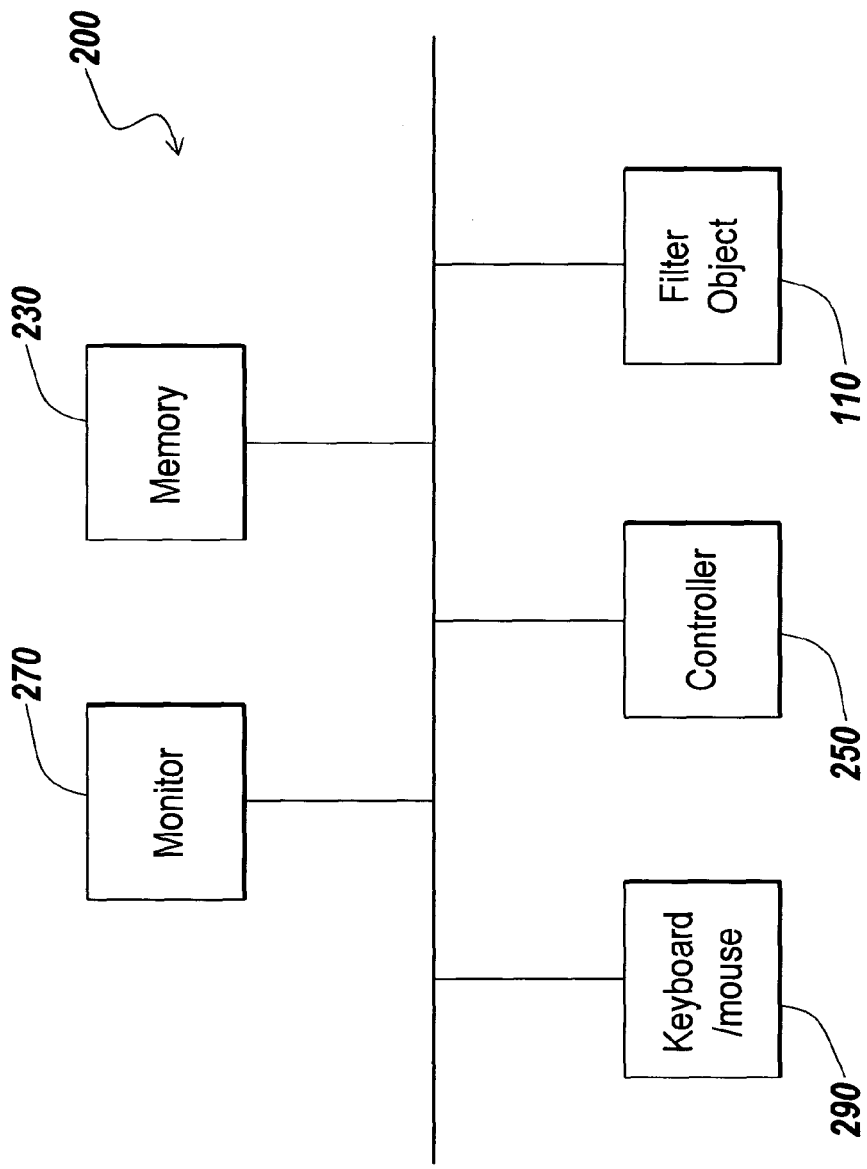
FIG. 2 is an illustrative block diagram representation of a computer suitable for practicing the illustrative embodiment of the digital filter object depicted in FIG. 1.

FIG. 2 is an exemplary block diagram representation of a computer 200 suitable for practicing the illustrative embodiment of the digital filter object 110 depicted in FIG. 1. The computer 200 includes a filter object 110, a memory 230, a controller 250, a monitor 270 and a keyboard/mouse 290. The filter object 110 receives input data U and produces output data Y on an output device, such as the monitor 270. The computer 200 receives through the keyboard/mouse 290 control data for implementing and operating the filter object 110. The control data may include information on the coefficients and the structure of the filter object 110 or the adapting algorithm that the filter object 110 performs in adaptive filters. The coefficients of the filter object 110 provide characterization of the filter object 110 including the cutoff frequency where the magnitude response of the filter reaches a specific value. The structure of the filter 100 includes, for example, a direct form I and a direct form II. The adapting algorithm includes, for example, traditional Least Mean Squares (LMS) and Recursive Least Squares (RLS) algorithms. The digital filter object 110 has essentially different state-space representations of a same filter depending on the structure of the filter object 110 or the adapting algorithm of the filter object 110.

The computer also receives control data for controlling the implemented filter object 110. The control data may include an initial value of the state of the filter, which may preset the state to a certain value including zero. The control data may include other information for controlling the initial state of the system. For example, the control data may include a selection of "on" or "off" to reset the state of the filter object 110. If the selection of "on" is input through the control data, the state of the system is reset at the beginning of operation. On the other hand, if the selection of "off" is included in the control data, the state of the system is not reset at the beginning of operation and the value retained in the filter object 110 is used as an initial state of the filter object 110. One of skill in the art will appreciate that the control data is not limited to the information described above. Rather, the control data may include any information that is needed for implementing or controlling the digital filter object 110.

The controller 250 establishes equations that are to be processed in the filter object 110 based on the control data including the coefficients and the structure or the adapting algorithm of the filter object 110. The digital filter object 110 of the illustrative embodiment of the present invention includes linear or non-linear filters. In the most general form, a discrete-time filter can be represented mathematically in a state equation, $x[n+1]=f(x[n], u[n], n)$, and an output equation, $y[n]=g(x[n], u[n], n)$, where $y[n]$ is the output of the filter, $u[n](t)$ is the input of the filter and $x(t)$ is the state of the filter. One of skill in the art will appreciate that a continuous-time filter can be represented mathematically in a similar state equation, $x(t)=f(x(t), u(t), t)$, and an output equation, $y(t)=g(x(t), u(t), t)$ where $y(t)$ is the output of the filter, $u(t)$ is the input of the filter and $x(t)$ is the state of the filter. $f(\ )$ and $g(\ )$ in the expression above are in general nonlinear functions that describe the dynamics of the filter object 110. In the special case of linear filters, the equations above can be written as: $x[n+1]=A[n]x[n]+B[n]u[n]$ and $y[n]=C[n]x[n]+D[n]u[n]$, where A, B, C and D are matrices characterizing the filter object 110. One of skill in the art will also appreciate that a continuous-time filter can be represented mathematically in a similar way: $x(t)=A(t)x(t)+B(t)u(t)$ and $y(t)=C(t)x(t)+D(t)u(t)$. For a special case of linear time-invariant dynamical filters, the expressions are reduced to $x[n]=Ax[n]+Bu[n]$ and $y[n]=Cx[n]+Du[n]$ for the discrete-time filter, and $x(t)=Ax(t)+Bu(t)$ and $y(t)=Cx(t)+Du(t)$ for the continuous-time filter. The filter object 110 has different state-space representations depending on the structure of the filter object 110 or the adapting algorithm of the filter object 110.

The computer may also receive control data for the initial value of the state of the filter object 110 and store it in the memory 230. The initial value stored in the memory 230 may be a certain value including zero. If the state of the filter object 110 is not preset nor reset, the value stored in the process of previous input data is used as the initial state of the filter object 110.

The filter object 110 can be utilized to implement a corresponding test bench or filter analysis. The filter object 110 can also be utilized to generate code that is separate from the filter object 110 itself. This code can be utilized to implement the operation of the corresponding filter algorithm outside the context of the simulation environment; here, this implies outside of the MATLAB environment or some other dynamically typed text-based language. The code could be utilized for either software or hardware implementations. The software implementations may include the use of the code on a general purpose processor, a digital signal processor, or other programmable compute architecture. Furthermore, the code generation can be utilized to create code that allows for simple re-creation of the filter object 110 itself, when the code is run from within the text-based dynamically typed programming language itself.

The generated code is a textual or graphical description language. The generated code may be a high-level programming language such as M, C, C++, JAVA or Ada, or it may be low-level machine or assembly language. Furthermore, the code may be generated for use in creating Field Programmable Gate Arrays (FPGAs), Complex Programmable Logic Device (CPLD), or Application Specific Integrated Circuit (ASIC) device, in which case the generated code is often known as Hardware Description Language (HDL) including VHSIC Hardware Description Language (VHDL), Verilog, or other hardware description language.

This code may be utilized on the same host machine from which the code is generated. Applications for this include accelerating the performance of the filter algorithm, or allowing standalone operation of the filter algorithm. In addition, the code generated from the filter object 110 may be utilized on an external host machine not associated with the computer from which the code was generated, such as an embedded processor or other hardware device. The host machine may include a computer system or architecture depicted in FIG. 2 where the filter object is simulated or instantiated.

The filter object 110 is particularly well-suited to enable the automatic code generation process, since it contains all the architectural and operational details of the filter algorithm, including filter structure, number of states, filter coefficients, and potentially initial values for memory registers, etc.

Figure 3:
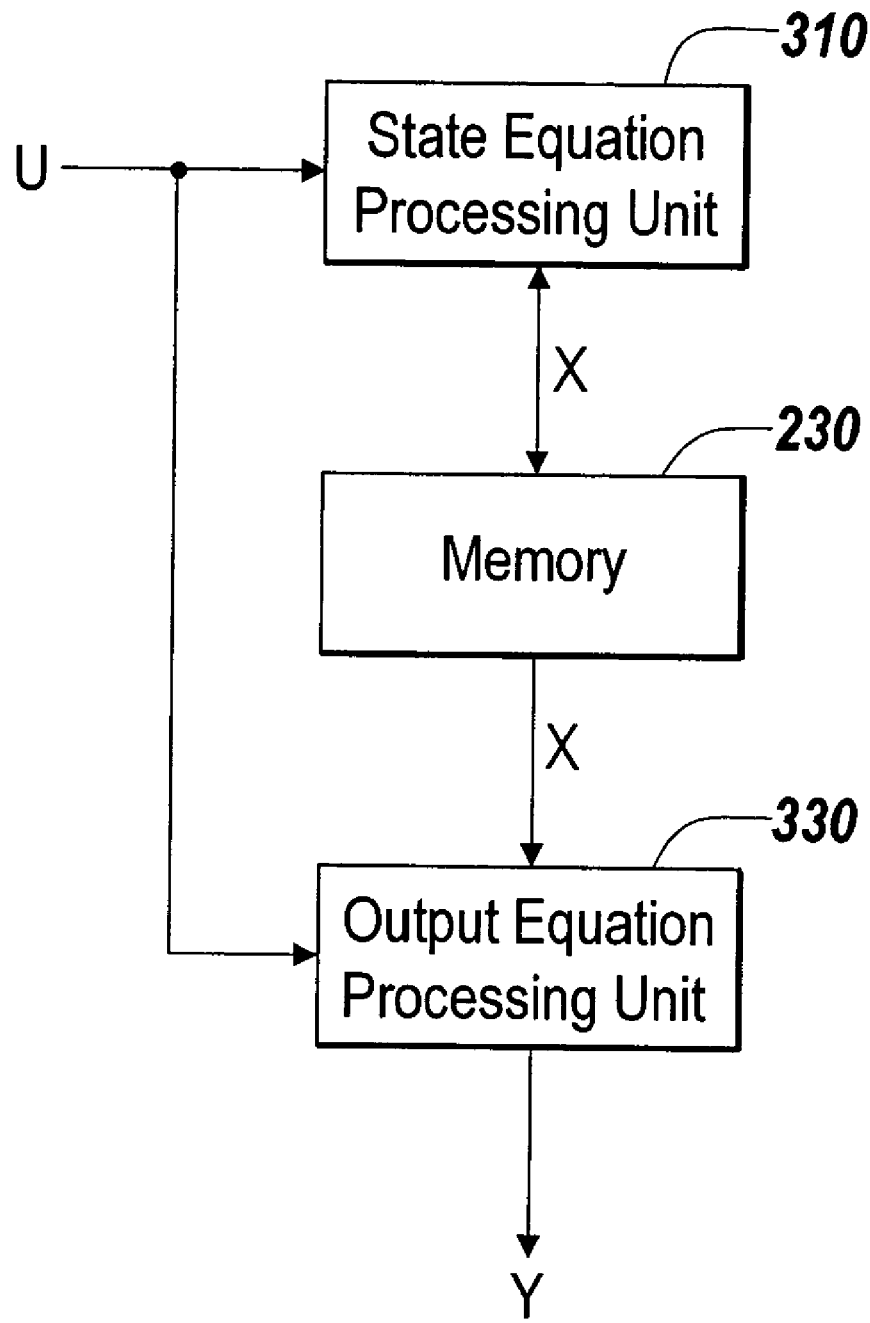
FIG. 3 is an illustrative block diagram representation illustrating in more detail the digital filter object depicted in FIGS. 1 and 2.

The filter object 110 processes equations representing the filter object 110 which include the state equation and output equation, as described above. FIG. 3 is an exemplary block diagram representation illustrating in more detail the filter object 110 depicted in FIG. 2. The filter object 110 includes a state equation processing unit 310 and an output equation processing unit 330. The state equation processing unit 310 receives input data U and the initial state stored in the memory 230. The state equation processing unit 310 processes the state equation and determines the state X of the filter object 110 in response to the initial state and the given input U of the filter object 110. The determined state of the filter is stored in the memory 230 and used as an initial state in processing next input data. The output equation processing unit 330 receives input data U and the state of the filter stored in the memory 230. The output equation processing unit 330 processes the output equation in response to the input U and the state X provided from the memory 230, and produces the output Y of the filter object 110.

Figure 4A:
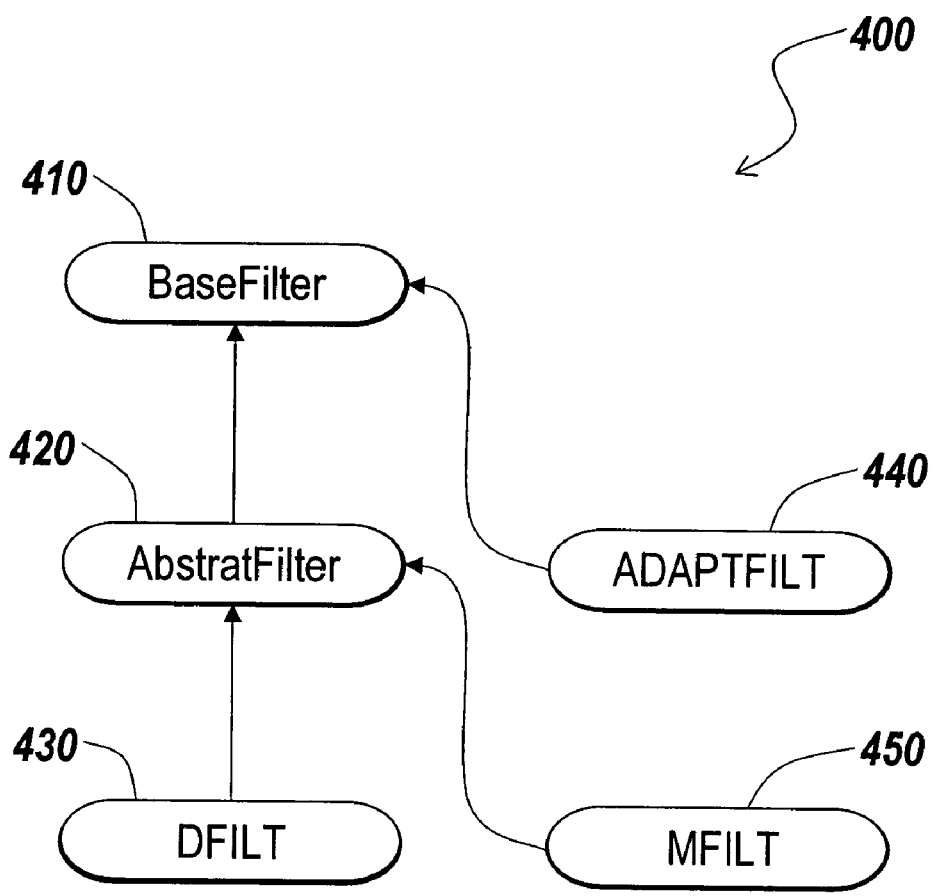
FIG. 4A is an exemplary hierarchy of classes for digital filter objects implemented and used in the illustrative embodiment of the present invention.

FIG. 4A is an exemplary hierarchy of classes for digital filter objects implemented and used in the illustrative embodiment of the present invention. The filter objects of the illustrative embodiment of the present invention are implemented and used in a dynamically typed text-based programming environment, such as MATLAB and PYTHON. The hierarchy 400 includes a DFILT class 430, an MFILT class 450, an AbstractFilter class 420, an ADAPTFILT class 440 and a BaseFilter class 410. Each class provides generalized descriptions for a group of objects that can exist within its class. The classes have properties and methods that characterize any member (object) of the classes. The properties of an object are the data associated with the object and determine the attributes of the object, and the methods of an object are operations (or functions) performed on the object. One of skill in the art will appreciate that the hierarchy 400 is illustrative and may be different in another embodiment of the present invention.

The DFILT class 430 enables the instantiation of discrete time filter objects that operate on a sample-by-sample, block-by-block or frame-by-frame basis. The discrete time filter objects may have various structures including Direct-form I, Direct form II, etc. The discrete time filter objects are instantiated from the DFILT class 430. The MFILT class 450 contains instances of multirate filter objects that operate on a sample-by-sample, block-by-block or frame-by-frame basis. The multirate filter objects may include decimators and interpolators, and fractal decimators and fractal interpolators. The structures of the multirate filters may include Direct-form Finite Impulse Response (FIR) polyphase, Direct-form transposed FIR polyphase, etc. The multirate filter objects are instantiated from the MFILT class 450.

The AbstractFilter class 420 is a parent class of the DFILT and MFILT classes 430 and 450. The DFILT and MFILT classes 430 and 450 are child classes which are derived from the parent class, the AbstractFilter class 420. The parent class is not suitable for instantiation and used to abstract out incomplete sets of features which may be shared by a group of sibling classes, the DFILT class and MFILT class 450, which are to add different variations. The parent class is a super class which contains abstract methods and is defined such that subclasses are to extend it by implementing the methods.

The ADAPTFILT class 440 enables the instantiation of adaptive filter objects that operate on a sample-by-sample or block-by-block basis. The adapting algorithms of the adaptive filters may include Least Mean Square (LMS) adaptive filter algorithm, Recursive Least Square (RLS) adaptive filter algorithm, etc. The adaptive filter objects are instantiated from the ADAPTFILT class 440. The BaseFilter class 410 is a parent class of the AbstractFilter class 420 and ADAPTFILT class 450.

Figure 4B:
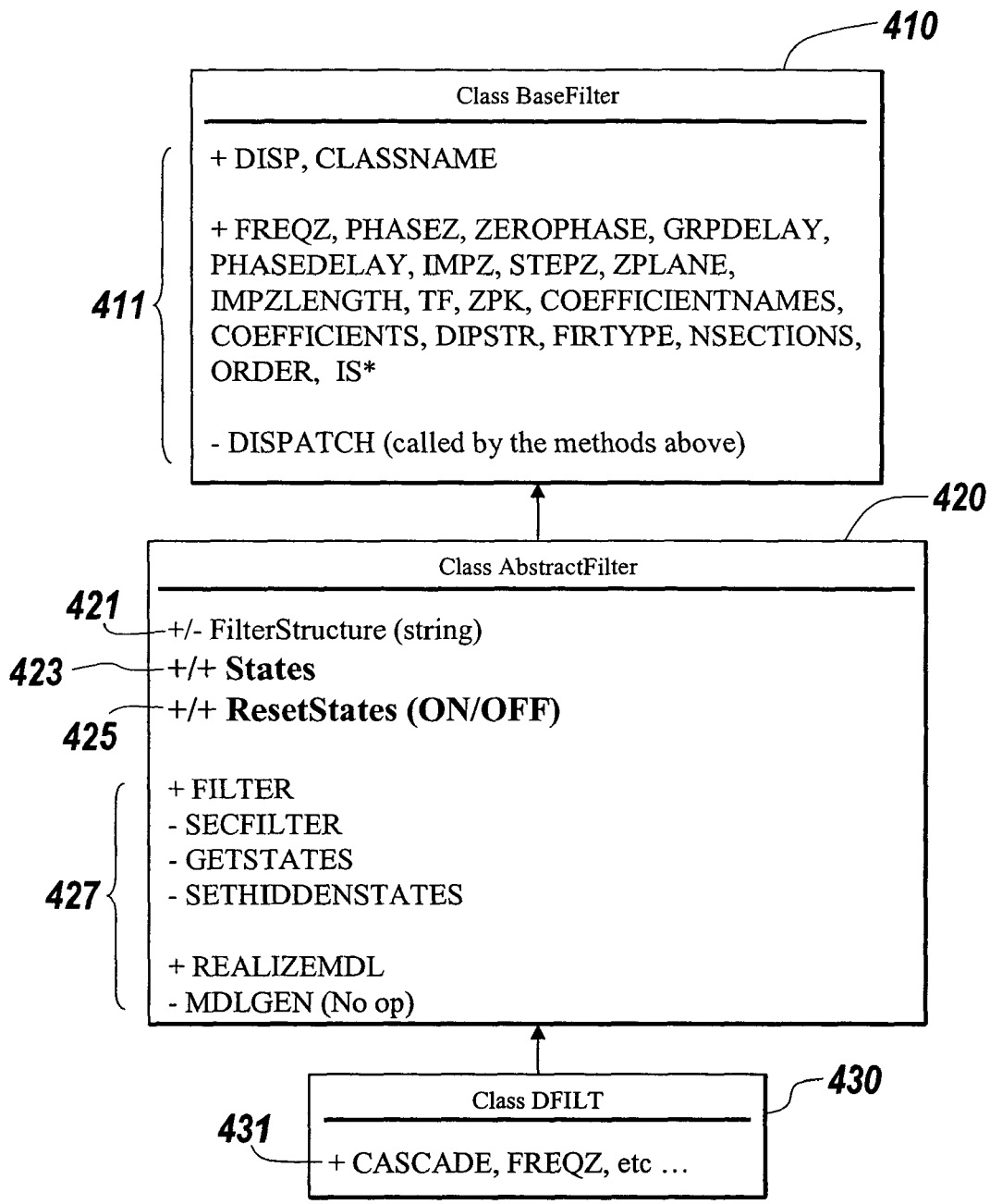
FIG. 4B illustrates in more detail the hierarchy of classes for the DFILT class depicted in FIG. 4A.

FIG. 4B illustrates in more detail the hierarchy of the classes for the DFILT class depicted in FIG. 4A. The DFILT class 430 has methods 411 that extend the AbstractFilter class 420, the parent class of the DFILT class 430. One of skill in the art will appreciate that the DFILT class 430 can extend the AbstractFilter class 420 by adding more properties. The AbstractFilter class 420 includes properties, such as a FilterStructure 421, States 423 and ResetStates 425, and methods 427 that can operate on the objects of the class. The FilterStructure 421, States 423 and ResetStates 425 properties represent information on the filter structure, the state of the filter and the selection of "on" or "off" to reset the state of the filter at the beginning of operation, respectively. The filter objects are instantiated from a DFILT class 420. The DFILT class 430 inherits from the AbstractFilter class 420 the FilterStructure 421, States 423 and ResetStates 425 properties along with other properties that define the filter. One of skill in the art will appreciate that the DFILT class 430 may include the FilterStructure 421, States 423 and ResetStates 425 properties instead of inheriting from the AbstractFilter class 420. The BaseFilter class 410, a parent class of the AbstractFilter class 420, includes methods 411 that can operate on the objects of the class.

FIG. 5 is an exemplary display 500 in a computer suitable for practicing the illustrative embodiment of the present invention. The computer provides a MATLAB environment which is one of dynamically typed text based programming environments. The display 500 shows the MATLAB command sequences to implement a filter object in the illustrative embodiment of the present invention.

In the first command line 510, the coefficients of a filter are provided to implement a filter object. The [b,a]=butter(N, Wn) command provided in the MATLAB environment an order N low pass digital Butterworth filter with cutoff frequency Wn. In the example, [b,a]=butter(12,0.25) returns filter coefficients in length 12+1 row vectors b and a, with coefficients in descending powers of $z^{-1}$. In the second command line 520, a filter object is instantiated from a class, such as the DFILT class 430 depicted in FIGS. 4A and 4B, by designating the structure and coefficients of the filter to be implemented. In the example, df2 represents the structure of Direct Form II filter.

If the coefficients and the structure of the filter are entered, the display 500 of the computer shows the content 530 of the filter object Hd implemented. The filter object Hd contains five properties including FilterStructure, States, ResetStates, Numerator and Denominator. The FilterStructure 540 contains the information on the structure of the filter object Hd instantiated in the second command 520. The structure of the filter object Hd is designated to 'Direct form II.' The State 550 of the filter object Hd is a vector having 12 elements the number of which is equivalent to the order of the filter object Hd, and containing the state information of the filter object Hd. The State 550 retains the current state of the filter object Hd. Before the filter object Hd operates, the State 550 corresponds to the initial conditions and after the filter object Hd operates, the States 550 correspond to the final conditions. The ResetState 560 of the filter object Hd is defaulted "on" to reset the initial value of the State 550 at the beginning of the operation. If the ResetState is set to "off," the State 550 of the filter object Hd is not reset to clear the initial state of the filter object Hd and retains the state information obtained in the previous process of input data. The numerator 570 and denominator 580 of the filter object Hd indicate row vectors having 13 elements entered through the first command 510.

Figure 6:
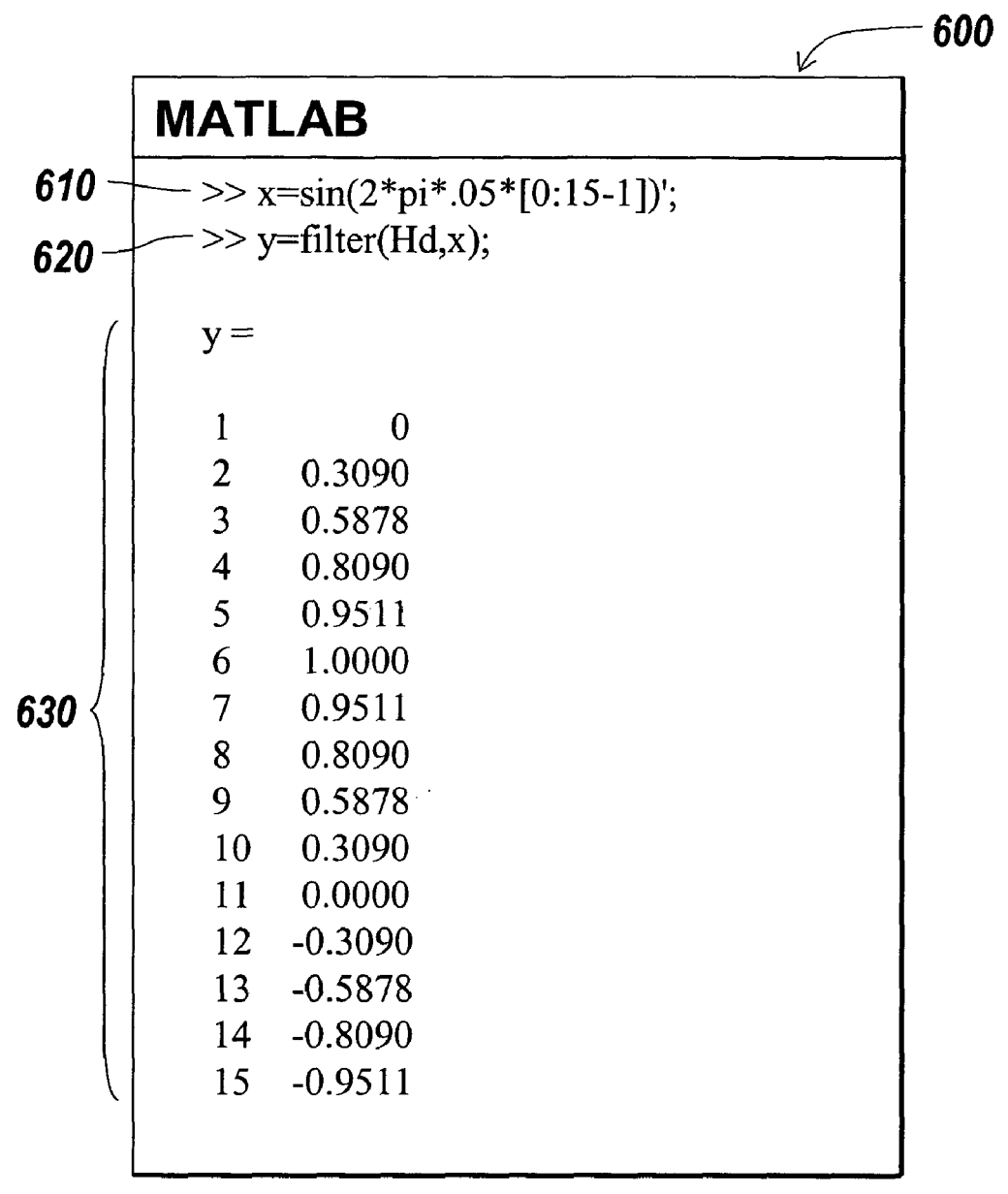

FIG. 6 is an exemplary display 600 that displays the MATLAB command sequences for using the filter object Hd implemented in FIG. 5. The computer provides a MATLAB environment, as in FIG. 5. The computer includes the filter object Hd that is implemented in FIG. 5. A single sequence of input data is obtained in the first command line 610. The input data is applied to the filter object Hd in the second command line 620. The "filter" command in the second command line 620 is one of the methods included in the AbstractFilter class 420 depicted in FIGS. 4A and 4B, which operates on the filter objects of the class. The output 630 of the filter object Hd is displayed in the display 600.

FIG. 7 is an exemplary display 700 which displays the MATLAB command sequences for performing streaming data processing by using the filter object implemented in FIG. 5. The computer provides the same MATLAB environment as in FIG. 5. The computer contains the filter object Hd implemented in FIG. 5. In the first command 710, the ResetState of the filter object Hd is set to 'off,' which commands that the State 550 of the filter object Hd be not reset at the beginning of operation. In the second command 720, the single sequence of input data depicted in FIG. 6 is divided into three sequences of input data. In the third command line 730, the divided sequences of input data is applied to the filter object Hd. The filter object Hd processes the first group of input data (the result shown in 740) and retains the State in the filter object Hd. The State of the filter object that is obtained in the process of the first sequence of input data is used as an initial State of the filter object in processing the second sequence of input data (the result shown in 750). In a similar manner, the State of the filter object that is obtained in the process of the second sequence of input data is retained in the filter object and used as an initial State of the filter object in processing the third sequence of input data (the result shown in 760). As a result, the output of the filter object in response to the three divided sequence of input data is equal to the output of the filter object produced in response to a single sequence of input data, as shown in FIG. 6.

The illustrative embodiment of the present invention provided a filter object implemented in dynamically typed text-based programming environment, which retains state information. In processing multiple sequences of input data, the state information obtained in processing a sequence of input data is stored and used as an initial value of the state of the filter object in processing the following sequence of input data. As a result, the illustrative embodiment of the present invention can efficiently process a long sequence of data by dividing the long sequence of input data into multiple sequences of input data and processing each sequence of input data.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in systems other than digital filters. Practitioners of the art will realize that the sequence of steps and architectures depicted in the figures may be altered without departing from the scope of the present invention and that the illustrations contained herein are singular examples of a multitude of possible depictions of the present invention.

We claim:

1. In a computer system, a method for implementing and using a filter object, the method comprising:
   providing the filter object instantiated from an object class in a dynamically typed text-based programming environment, the filter object including a state, and the filter object being represented by:
      an output equation for generating an output of the filter object, and
      a state equation for updating the state of the filter object;
   implementing the filter object; and
   determining an output of the filter object based on an input to the filter object in the dynamically typed text-based programming environment, determining the output of the filter object including:
      receiving the input at the filter object,
      identifying a first state of the filter object,
      splitting up the input into a first input and a second input,
      invoking a first call to a filtering method of the filter object to:
         process the output equation to determine a first output of the filter object based on the first input of the filter object and the first state of the filter object,
         process the state equation to determine a second state of the filter object based on the first input of the filter object and the first state of the filter object,
         retain the second state of the filter object in the dynamically typed text-based programming environment, and
      invoking a second call to the filtering method of the filter object to process the output equation to determine a second output of the filter object based on the second input of the filter object and the second state of the filter object that has been retained.

2. The method of claim 1 wherein the filter object retains a final state obtained after the second call to the filtering method of the filter object.

3. The method of claim 1 further comprising the step of resetting a state of the filter object retained in the filter object.

4. The method of claim 1 further comprising the step of presetting a state of the filter object retained in the filter object.

5. The method of claim 1 wherein the filter object generates code for implementing a corresponding filter algorithm.

6. The method of claim 5 wherein the filter object executes in a simulation environment, and the generated code is executed outside a context of the simulation environment in which the filter object executes.

7. The method of claim 6 wherein the generated code is in a textual language.

8. The method of claim 6 wherein the generated code is in a graphical description language.

9. The method of claim 5 wherein the filter object executes in a simulation environment, and the generated code is executed within a context of the simulation environment in which the filter object executes.

10. The method of claim 5 wherein the generated code is executed in an environment separate from a computer system used for a simulation of the filter object, including an embedded system implementation.

11. The method of claim 10 wherein the generated code is in a textual language.

12. The method of claim 10 wherein the generated code is in a graphical description language.

13. The method of claim 10 wherein the generated code is suitable for use with a software implementation, the software implementation being adapted for use of the generated code on at least one of a general purpose processor, a digital signal processor, and a programmable computer architecture.

14. The method of claim 10 where the generated code is suitable for use with a hardware implementation, the hardware implementation including use with at least one of a Field Programmable Gate Array (FPGA), Complex Programmable Logic Device (CPLD), and Application Specific Integrated Circuit (ASIC) device, the generated code being written in hardware description language.

15. The method of claim 5 wherein the code is written in a high-level programming language.

16. The method of claim 5 wherein the code is written in a low-level machine or assembly language.

17. The method of claim 14 wherein the generated code is suitable for use with a software implementation, the software implementation being adapted for use of the generated code on at least one of a general purpose processor, a digital signal processor, and a programmable computer architecture.

18. The method of claim 1, wherein the filter object operates on a sample-by-sample, block-by-block or frame-by-frame basis.

19. A computer-implemented method for generating an output of a system in response to an input to the system, the method comprising:
    implementing the system using a dynamically typed text-based programming environment the system including a filter object with a filtering method, the filter object being instantiated from an object class in the dynamically typed text-based programming environment; and
    using the system in the dynamically typed text-based programming environment, the system:
        dividing the input to the system into a first input to the system and a second input to the system;
        invoking a first call to the filtering method of the filter object to:
            determine a first output of the system based on the first input to the system and a first state of the system;
            determine a second state of the system based on the first input to the system and the first state of the system;
            retain the second state of the system in the dynamically typed text-based programming environment so that the second state is available after the output of the system is determined; and
        invoking a second call to the filtering method of the filter object to determine a second output of the system based on the second input to the system and the second state of the system that has been retained.

20. The method of claim 19 further comprising specifying equations that the system processes to generate the output of the system using the input to the system and a state of the system.

21. The method of claim 19 further comprising controlling a state of the system retained in the memory.

22. The method of claim 21 wherein a state of the system retained in the memory is reset to provide a zero initial state to the system.

23. The method of claim 21 wherein a state of the system retained in the memory is set to a particular value entered by a user.

24. The method of claim 19 wherein a state of the system retained in the memory includes a final state obtained by processing the input to the system.

25. The method of claim 19 wherein a state of the system is an initial state of the system for processing the input of the system.

26. The method of claim 19, wherein the system operates on a sample-by-sample, block-by-block or frame-by-frame basis.

27. A computer readable medium holding instructions executable in a computer that provides a dynamically typed text-based programming environment, the instructions for:
    providing an object, the object being an instance of a class in the dynamically typed text-based programming environment;
    dividing an input to the object into a first input to the object and a second input to the object;
    invoking at least one method of the object to:
        perform a first operation to determine a first output of the object based on the first input to the object and a first state of the object;
        perform a second operation to determine a second state of the object based on the first input to the object and the first state of the object;
        after completion of the first and second operations, retain the second state of the object in the dynamically typed text-based programming environment;
        make the second state available after determining the output of the object; and
    invoking the at least one method of the object to determine a second output of the object based on the second input to the object and the second state of the object that has been retained.

28. The medium of claim 27 wherein the object includes an adaptive filter object.

29. The medium of claim 28 wherein the adaptive filter object includes an adapting algorithm that the adaptive filter implements.

30. The medium of claim 27 wherein the object includes a discrete time filter object.

31. The medium of claim 27 further storing instructions for controlling properties of the object including a state of the object.

32. The medium of claim 31 wherein the state of the object is reset to zero.

33. The medium of claim 27 further storing instructions for inheriting a state property corresponding to a state of the object from an abstract class.

34. The medium of claim 27 further storing instructions for providing the class with methods which operate on the object of the class.

35. The medium of claim 27, wherein the object operates on a sample-by-sample, block-by-block or frame-by-frame basis.

36. A system for implementing a filter object, the system comprising:
    a processor configured to:
        instantiate an instance of the filter object in a dynamically typed text-based programming environment;
        split an input to the filter object into a first input to the filter object and a second input to the filter object;
        process an output equation of the filter object processed in a first operation to determine a first output of the filter object based on the first input to the filter object and a first state of the filter object, and processed in a second operation to determine a second output of the filter object based on the second input to the filter object and a second state of the filter object;

process a state equation of the filter object processed in a third operation to determine the second state of the filter object based on the first input to the filter object and the first state of the filter object; and a memory for retaining the second state of the filter object in the dynamically typed text-based programming environment after completion of the first and third operations so that the second state is available after the output equation and the state equation are processed.

37. The system of claim 36, wherein the second state retained in the memory is used as a state of the filter object in processing a next input of the filter object.

38. The system of claim 36, wherein a state of the filter object retained in the memory is reset to provide a zero initial state.

39. The system of claim 36, wherein a state of the filter object retained in the memory is set to a particular value entered by a user.

40. The system of claim 36, wherein the input of the filter object comprises a single piece of sample data, a sequence of sample date or multiple sequences of sample data.

* * * * *

UNITED STATES PATENT AND TRADEMARK OFFICE
CERTIFICATE OF CORRECTION

PATENT NO.         : 7,840,938 B1                                    Page 1 of 1
APPLICATION NO.    : 10/634304
DATED              : November 23, 2010
INVENTOR(S)        : Paulo Pacheco et al.

It is certified that error appears in the above-identified patent and that said Letters Patent is hereby corrected as shown below:

At column 3, line number 19, please insert --.-- after "data"

At column 3, line number 45, please delete "Calif" and insert --California.--

Signed and Sealed this
Twenty-fourth Day of April, 2012

David J. Kappos
*Director of the United States Patent and Trademark Office*